July 10, 1951     F. H. H. FOSS     2,560,427
SLIP CUSHION COUPLING
Filed Sept. 19, 1945
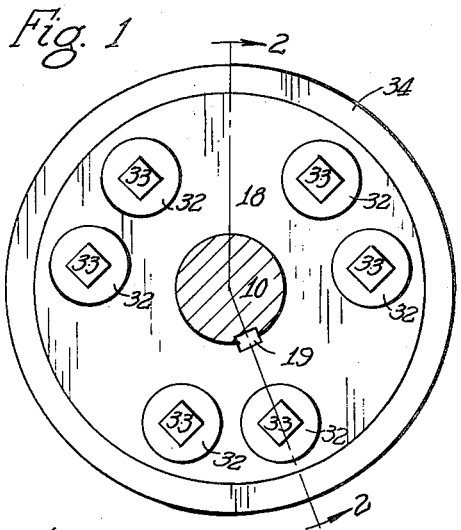
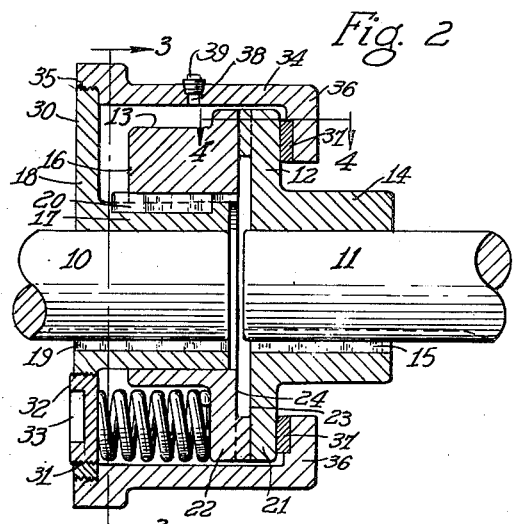
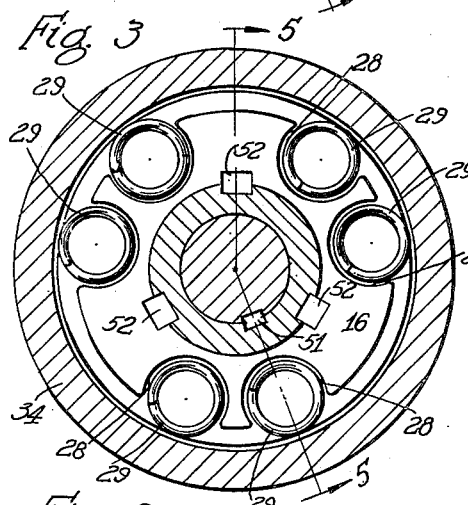
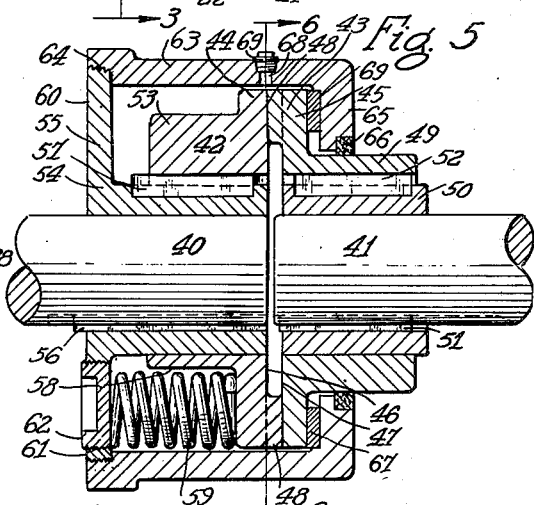
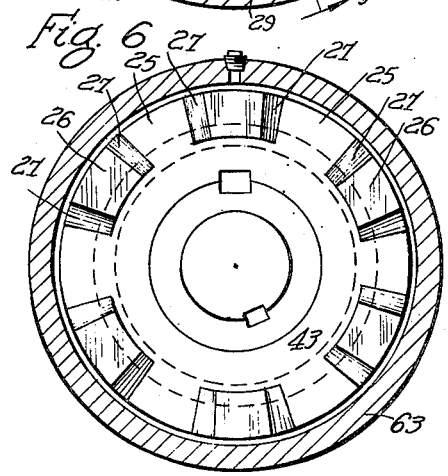
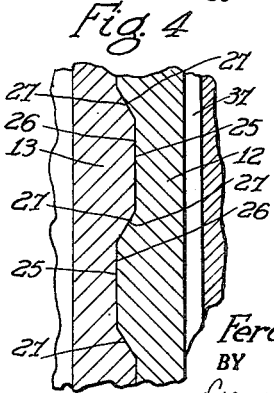
INVENTOR.
Ferdinand H. H. Foss
BY
Cromwell, Greist & Warden
ATTORNEYS Patented July 10, 1951

2,560,427

UNITED STATES PATENT OFFICE 2,560,427

SLIP CUSHION COUPLING

Ferdinand H. H. Foss, Chicago, Ill., assignor, by mesne assignments, to Kerns Industrial Corporation, Chicago, Ill., a corporation of Illinois Application September 19, 1945, Serial No. 617,300

12 Claims. (Cl. 64—29)

My invention relates to couplings and more particularly to couplings for mechanically connecting shafting or the like for transmitting torque.

An object of my invention is to provide a slip cushion coupling for connecting shafting which will yield instantly in the case of shock, due to abrupt stoppage of the drive because of an obstruction, without resulting in damage.

Another object of my invention is to provide a coupling for connecting shafting which will release or slip when the torque reaches a predetermined value whereby breakage of the coupling and the shafting is minimized.

Another object of my invention is to provide a coupling which comprises frictionally engaging members resiliently held in engagement and provided with means for adjusting the members to transmit torque up to a predetermined value, the members slipping on each other and permitting relative movement of the shafts when the torque exceeds the predetermined value.

Another object of my invention is to provide a slip cushion type coupling provided with frictionally engaging members resiliently held in engagement by a series of spaced individually adjustable spring cushion members so mounted in the coupling that they may be removed individually without disassembly of the entire coupling to facilitate replacement of worn or broken spring members.

A further object of my invention is to provide a coupling wherein frictionally engaging members are mounted to move longitudinally of their respective shafts to provide for longitudinal play in either shaft.

A further object of my invention is to provide a coupling structure which is readily assembled and disassembled to facilitate replacement of worn or broken members.

Other objects and advantages of my invention will be apparent from a description of the preferred form of my invention and a modification thereof which are shown by way of illustration in the accompanying drawings wherein:

Fig. 1 is an elevation of a preferred form of my coupling;

Fig. 2 is a longitudinal section on the line 2—2 of Fig. 1;

Fig. 3 is a section on the line 3—3 of Fig. 2;

Fig. 4 is a section on the line 4—4 of Fig. 2;

Fig. 5 is a longitudinal section of a modified form of my invention; and

Fig. 6 is a section on the line 6—6 of Fig. 5.

Referring to the form of my coupling which is illustrated in Figs. 1 to 4, two aligned shaft ends are shown at 10 and 11. Either one of the shafts may be the driving shaft, but for convenience in description the shaft 10 may be considered the driving shaft while shaft 11 will be referred to as the driven shaft. The driving connection between the shafts comprises two complementary, coacting, or cooperating coupling members 12 and 13. The coupling member 12 comprises a sleeve, or hub portion, 14, which is provided with a central bore to receive the shaft 11 and is rigidly secured to the latter by a key 15. The coupling member 13 includes a hub or sleeve portion 16 having a central bore which receives the hub 17 of a member 18. The member 18 is provided with a central bore which receives the shaft 10 and is rigidly secured thereto by a key 19. The sleeve portion 16 of the member 13 is slidingly received upon the hub 17 and secured against rotation thereupon by a key 20. The coupling members 12 and 13 have radially extending disk or web portions 21 and 22 providing opposed faces 23 and 24. The opposed faces 23 and 24 are each provided with radially extending cam-like teeth which are shown in section in Fig. 4. These teeth comprise low portions 25 and high portions 26 connected by sloping surfaces 27. The teeth on the members 12 and 13 provide a frictional driving connection when they are held in interengaging relation.

The hub or sleeve portion 16 of the coupling member 13 is provided with a plurality of recessed portions or pockets 28 to accommodate compression springs 29. Any number of springs 29 may be used, but it is preferred to arrange these compression springs as shown in Fig. 3 in spaced pairs about the periphery of the hub 16.

The member 18 has a radially extending flange or web portion 30 provided with circumferentially spaced screw-threaded apertures 31 which are aligned with the recesses 28 in the coupling member 13, and in each aperture 31 there is provided a screw-threaded plug 32. By this arrangement each one of the springs 29 may be inserted or removed through the apertures 31 in the flange 30 and compression in the individual springs may be adjusted by movement of the corresponding screw-threaded plug 32. The plugs 32 are provided with a recess 33 to receive a conventional tool for removing or adjusting the same.

A tubular housing 34 is provided to enclose the operating portions of the coupling, one end of the housing having a screw-threaded connection 35 with the outer periphery of the flange 30 of the abutment member 18. At the other end of the housing 34 an inwardly turned flange portion 36 is provided. A sealing ring 37, of bronze or the like, is arranged between the inner surface of the flange 36 and the outer surface of the coupling member 12. An aperture 38 is provided in the housing 34 having a closure plug 39 so that the housing may be filled with oil and the movable members of the coupling may be operated in an oil bath.

Referring to Figs. 5 and 6, a modified form of my invention is illustrated. In this construction the driving shaft and the driven shaft are indicated by the numerals 40 and 41. Two complementary cooperating coupling members 42 and 43 are provided with radially extending flange or web portions 44 and 45, respectively. Arranged on the opposed surfaces 46 and 47 of the coupling are teeth 48 of the same profile as the teeth shown in the preferred form of my invention (Fig. 4), which interengage to provide frictional driving connection between the coupling members 42 and 43. In this construction the coupling member 43 is provided with a sleeve or hub portion 49 having a central bore which receives a sleeve 50. The sleeve 50 is rigidly secured to the shaft 41 by a key 51. The coupling member 43 is slidingly mounted on the sleeve 50 and retained against rotation thereon by the key 52. The coupling member 42 is similar to coupling member 13 in the form of my invention shown in Figs. 1 to 4 and comprises a hub or sleeve portion 53 having a bore which slidingly receives sleeve portion 54 of the abutment member 55 which is in turn rigidly secured to the shaft 40 by the key 56. Hub 53 is secured against rotation on the sleeve portion 54 by the key 57. The hub 53 is provided with a plurality of spaced recesses or pockets 58 which accommodate compression springs 59. The member 55 has a laterally extending web or flange portion 60 provided with screw-threaded apertures 61 which are aligned with respective recesses 58 in the hub 53 and provided with screw-threaded plugs 62. A casing 63 is connected by screw threads 64 at one end to the flange 60 of the member 55. At the other end of the casing 63 an inwardly turned flange 65 extends adjacent to the hub 49 of the member 43 and is provided with an oil seal 66. A sealing ring 67 of bronze or the like is provided between the opposed inner surfaces of the flange 65 and the web portion 45 of the coupling member 43. The casing 63 is provided with an aperture 68 and a plug 69 to permit the casing to be filled with oil.

When there is any longitudinal movement of the shaft 40, with or without load on the coupling, the entire coupling moves with it and the coupling member 49 slides on the key 52. When there is any longitudinal movement of the shaft 41 the coupling member 49 moves on the key 52 without movement of the entire coupling.

In all forms of the coupling when a load is applied to rotate the driving shaft the torque load on the coupling teeth is applied at the pitch line. The teeth instantly begin to slide up on each other thereby increasing the compression in the springs. In the case of a small load they slide only enough to take care of the load but in the case of an overload they slide completely over each other. In the case of shock this sliding action takes place instantly and prevents breakage. With my coupling instant stoppage of the drive by accidental obstruction will not result in damage. With my coupling when the load is applied on the teeth the resistance to the load will increase gradually and uniformly. The coupling operates as a self-contained unit. There is no end thrust transmitted to the shafting. Any end thrust developed in the coupling is transmitted through the key to the fixed casing member of the coupling and is absorbed in the coupling.

My coupling permits limited misalignment of the shafting and the adjustment of individual springs to compensate for such misalignment and to give uniform stress on the teeth and thereby minimize breakage of the same. The construction of the members so that the springs may be individually removed, when desired, facilitates assembly and disassembly of the structure and makes replacement of broken or worn springs a simple operation.

In the modified construction shown in Figs. 5 and 6 both complementary coupling members are slidingly connected to the shaft ends and permit some longitudinal movement in either shaft.

I claim:

1. A slip cushion coupling comprising complementary coupling members each having a sleeve portion adapted to be connected to the end of one of a pair of aligned shafts which are to be coupled in driving relation, each said coupling member having a radially extending web portion and teeth thereon interengaging with each other to provide a driving connection between the same, a tubular housing member enclosing the coupling members, an inturned flange on one end of said housing member in relatively rotatable frictional engagement with one of said coupling members, an inwardly directed member on the other end of said housing member, spring means arranged between said inwardly directed member and the other one of said coupling members yieldingly holding said coupling members with their teeth in interengaged driving relation, and said inwardly directed member and said other one of said coupling members having interengaging slidably related portions permitting axial but non-rotatable movement therebetween.

2. A slip cushion coupling comprising cooperating coupling members each having a sleeve portion connected to an end of a pair of substantially aligned power shafts and radially extending web portions in frictional engagement to provide a driving connection therebetween, a housing member enclosing the coupling members, an inwardly directed abutment member on one end of said housing member in relatively rotatable frictional engagement with one coupling member, an inwardly directed abutment member on the other end of said housing member spaced from said other coupling member, said last mentioned abutment and said other coupling member having portions in interengaging slidable relation, cushion means between said last mentioned abutment member and said coupling member to hold the coupling members in frictional engagement but allowing relative movement of the coupling members when the driving torque exceeds a predetermined value.

3. The structure as set out in claim 2 wherein said cushion means comprises a compression spring.

4. The structure as set out in claim 2 wherein said cushion means comprises a plurality of compression springs and means is provided to adjust the compression in each said spring.

5. The structure as set out in claim 2 wherein radially extending interengaging cam-like teeth are provided on said web portions of said coupling members.

6. A slip cushion coupling for drivingly connecting substantially aligned power shafts, comprising complementary coupling members having radially extending opposed faces and interengaging teeth thereon, each said coupling member having a sleeve portion slidably connected to a shaft end, a tubular outer casing surrounding said interengaging portions of said coupling members, an inwardly directed flange on one end of said casing having means frictionally engaging one of said coupling members, an inwardly directed member secured on the other end of said casing in spaced relation to the other one of said coupling members, and cushioning means between said inwardly directed member and said other one of said coupling members.

7. The structure as set out in claim 6 wherein said cushioning means comprises compression spring means.

8. The structure as set out in claim 6 wherein said cushioning means comprises compression spring means and means to adjust the compression in said spring means.

9. A slip cushion coupling comprising complementary coupling members each having a sleeve portion adapted to be connected to the end of one of a pair of aligned shafts which are to be coupled in driving relation, each said coupling member having a radially extending web portion and radially extending cam-like teeth thereon interengaging with each other to provide a driving connection between the same, a tubular housing member enclosing the coupling members, an inturned flange on one end of said housing member in relatively rotatable frictional engagement with one of said coupling members, an inwardly directed member on the other end of said housing member said inwardly directed member and said other coupling member having portions in interengaging slidable relation and individually adjustable spring cushion members arranged between said inwardly directed member and the other one of said coupling members yieldingly holding said coupling members with their teeth in interengaged driving relation.

10. A torque transmitting shaft coupling comprising a drive shaft member and a driven shaft member, a coupling member having a radially extending plate portion keyed to one of said shaft members, spaced radial cam-like teeth on said plate portion, a coupling member keyed to the other of said shaft members having a hub portion and a radially extending web portion, a coupling member splined on said hub portion and having a radially extending plate portion provided with spaced radial cam-like teeth thereon which are positioned to interengage with the teeth on the plate portion of the first mentioned coupling member, said last mentioned coupling member having spaced pairs of axially extending recesses, coiled compression springs in said recesses, said second mentioned coupling member having threaded apertures in said web portion aligned with the recesses in said last mentioned coupling member, threaded plugs in said apertures to retain the coiled springs in their respective recesses and to provide for adjusting the compression in said springs, an outer enclosing sleeve having one end in threaded engagement with the outer circumferential surface of the web portion of said second mentioned coupling member and having an inwardly directed flange on the other end in frictional sealing engagement with the first mentioned coupling member.

11. A slip cushion coupling for drivingly connecting substantially aligned power shafts, comprising complementary coupling members having radially extending opposed faces and interengaging teeth thereon, each said coupling member having a bore therein to receive the respective shaft ends, a sleeve member slidingly and non-rotatably received in the bore of one of said coupling members and adapted to be rigidly secured to one of said shaft ends, a tubular outer casing surrounding said interengaging portions of said coupling members, one end of said casing being secured to said sleeve member, compression spring members between said casing and the coupling member received on said sleeve member, and an inwardly directed flange on the other end of said casing in frictional engagement with the complementary coupling member.

12. A slip cushion coupling for drivingly connecting substantially aligned power shafts, comprising complementary coupling members having radially extending opposed faces and interengaging teeth thereon, each said coupling member having a bore therein to slidingly receive the respective shaft ends, a sleeve member slidingly and non-rotatably received in the bore of one of said coupling members and adapted to be rigidly secured to one of said shaft ends, a flanged sleeve member slidingly and non-rotatably received in the bore of the other of said coupling members and adapted to be rigidly secured to the other of said shaft ends, a tubular outer casing surrounding said interengaging portions of said coupling members, one end of said casing secured to said flanged sleeve member, compression spring members between said flanged sleeve member and the coupling member received on said flanged sleeve member, and an inwardly directed flange on the other end of said casing in frictional engagement with the complementary coupling member.

FERDINAND H. H. FOSS.

REFERENCES CITED

The following references are of record in the file of this patent:

UNITED STATES PATENTS

| Number | Name | Date |
| --- | --- | --- |
| 1,126,219 | Hupp | Jan. 26, 1915 |
| 2,333,553 | Potgieter et al. | Nov. 2, 1943 |

FOREIGN PATENTS

| Number | Country | Date |
| --- | --- | --- |
| 418,543 | Great Britain | of 1934 |